Patented Sept. 19, 1944

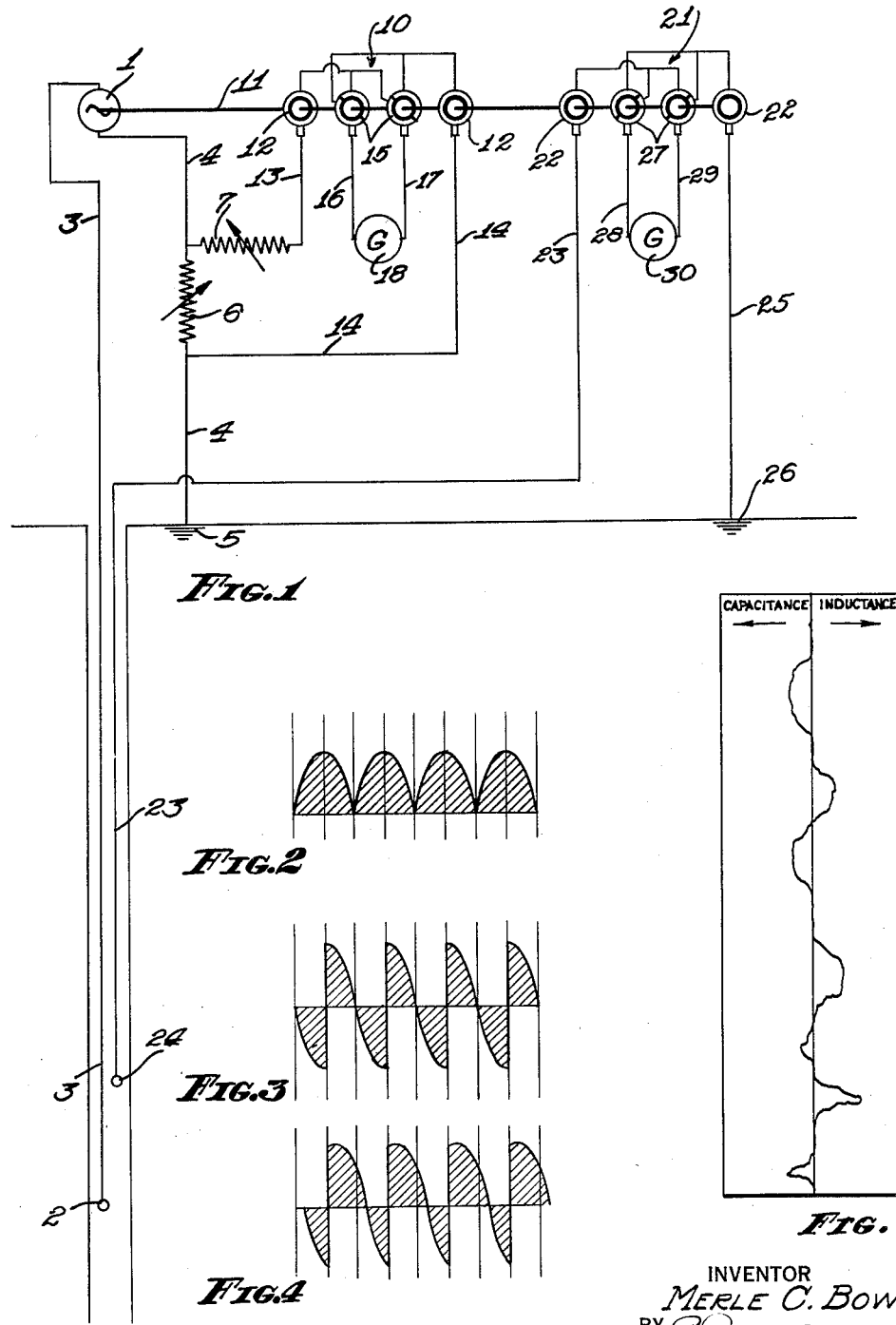

2,358,441

UNITED STATES PATENT OFFICE 2,358,441

INDUCTIVE-CAPACITIVE ELECTRICAL LOGGING

Merle C. Bowsky, Houston, Tex., assignor to Lane-Wells Company, Los Angeles, Calif., a corporation of Delaware Application July 12, 1941, Serial No. 402,111

3 Claims. (Cl. 175—182)

My invention relates to inductive-capacitive electrical logging; that is, to electrical logging of well bores in which the inductance and capacitance characteristics of formation are measured or detected. Among the objects of my invention are:

First, to provide an apparatus and method of inductive-capacitive electrical logging which is particularly simple in construction and in operation; and Second, to provide an apparatus and method of inductive-capacitive electrical logging which utilizes much of the present equipment employed for conventional direct current or alternating current resistivity electrical logging, whereby resistivity logs and inductive-capacitive logs may be obtained in conjunction with each other by simple adjustment and change in the apparatus.

With the above and other objects in view, as may appear hereinafter, reference is directed to the accompanying drawing, in which:

Figure 1 is a simplified wiring diagram illustrating my method and apparatus;

Figure 2 is a chart showing the character of current in the probe circuit when adjusted to an in-phase relationship with the input circuit;

Figure 3 is a similar chart showing the voltage when the probe circuit is electrically 90° out of phase with the input circuit;

Figure 4 is another chart showing the voltage condition when the capacitance or inductance characteristics of the formation cause a phase shift; and Figure 5 is an idealized representation of a capacitive-inductive log obtained by my apparatus.

With reference to Figure 1, an input circuit is provided which comprises a source of electrical energy 1 connected to an electrode 2 by a conductor of 3, which may form one conductor of a multiple conductor cable. The other side of the alternating current source is connected by a conductor 4 to a ground 5. A variable resistance 6 is interposed in the conductor 4.

A reference commutator 10 is provided, which is driven preferably by a shaft 11 connected with the alternating current source so as to rotate in synchronism therewith. The reference commutator comprises slip rings 12 which are connected through brushes and leads 13 and 14 to opposite sides of the resistance 6. A second variable resistance 7 is placed in lead 13 or 14. The commutator 10 is provided with segments 15 which are connected to brushes and leads 16 and 17 with a galvanometer 18.

The number and arrangement of the segments 15, with respect to the alternating current source, is such that a half wave rectification of the current may be obtained at the galvanometer 18, so that a direct current galvanometer may be used to indicate the current flowing in the input circuit. The preferred adjustment of the segments 15 is such that they are exactly "in phase" with the source of alternating current, so that the signal received by the reference galvanometer 18 appears as shown in Figure 2, so that the galvanometer has a maximum response to the current in the input circuit.

A probe circuit is provided which comprises a probe circuit commutator 21 similar to the commutator 10. Slip rings 22 are provided, one of which is connected by a conductor 23 which may form part of a multiple conductor cable and which is provided at its lower end with a probe electrode 24. The other slip ring 22 of the probe circuit commutator is connected by a conductor 25 to a ground 26. The commutator 21 is provided with segments 27 connected by brushes and leads 28 and 29 to a galvanometer 30.

The probe circuit commutator 21 is adjusted so that it is displaced electrically 90° from the reference commutator 10. Thus when the reference commutator is exactly in phase with the alternating current source, producing a rectified current as shown in Figure 2, the probe circuit commutator 21 is out of phase, producing a current such as shown in Figure 3. In this situation the galvanometer 18 has a maximum response, while galvanometer 30 has a zero response. It should be pointed out that the galvanometers 18 and 30 are "dampened" sufficiently to indicate the average condition of the current.

The phase relationship of the two galvanometers may be fixed or adjustable and either or both of the galvanometers may be adjustable in phase with respect to the altering current source.

My method of electrical logging, wherein inductive and capacitive effects of formation traversed by the well bore are employed, is carried out as follows:

The reference commutator and its galvanometer 18 are adjusted to their maximum or "in phase" position. This is done while the electrodes are within the metal well casing which usually lines the upper part of the well bore, or while the electrodes are opposite a formation known to have little or no inductive or capacitive characteristics. The probe current commutator 21 is adjusted so that it is 90° out of phase so that its galvanometer 30 reads zero. This may be done automatically with adjustment of the reference commutator after the commutators are secured to the shaft 11 in a predetermined relative position. The electrodes are then lowered in the well bore and as the probe electrode passes a formation having a capacitive or inductive effect the current in the probe circuit will lead or lag from the true or 90° out-of-phase position shown in Figure 3 and will produce a curve such as shown in Figure 4. If the capacitive characteristics of a formation cause the upper portion of the curve above the neutral line in Figure 4 to predominate, then an inductive effect will cause the lower portion of the curve to predominate, and as these portions become unbalanced the galvanometer 30 will move accordingly. Thus, by using a recording galvanometer, a chart such as shown in Figure 5 is obtained, in which the center line represents the neutral or zero position of the galvanometer and the deviations on one side of this line indicate the response to capacitive characteristics, while deviations on the other side indicate response to inductive characteristics of the formation.

The inductive or capacitive characteristics of formation, or more accurately, the fluid contained therein, are small in magnitude. However, it should be noted that the phase need shift only a slight amount from the 90° out-of-phase position to materially change the relative parts of the curve above and below the neutral line. Thus the galvanometer 30 is inherently sensitive to the capacitive and inductive changes.

It should be pointed out that the method may be employed by using either the "null balance system" or the "off balance system." If the galvanometer 30 is set to initial zero position and allowed to move to either side of this position as the inductive or capacitive characteristics of the formation may influence it, then the system is known as an "off balance" system. If, however, the commutator is continually adjusted so as to maintain the galvanometer 30 in a neutral position, and the amount of movement required to accomplish this is recorded in some manner, the system is known as a "null balance" system. It is contemplated that either system may be employed in the exercise of my invention. In either system the resulting curve will be similar to that shown in Figure 5. The principal purpose of the reference commutator 10 is to determine when the probe circuit commutator is in the proper out-of-phase relationship with the alternating current source. Consequently, it is not mandatory that the reference commutator be set to indicate a maximum position on the galvanometer 18 for the out-of-phase position of the probe circuit commutator 21, but may be set to likewise indicate an out-of-phase position. In other words, both galvanometers 18 and 30 may read zero when the desired setting of the probe commutator 21 has been attained.

While I have indicated operation of my inductive-capacitive electrical logging system under idealized conditions, i. e., conditions in which it is assumed that there is no change in the resistance of the formation being logged, it should be recognized that practically such ideal conditions are not obtained, but that changes in the resistance of the formation will affect the curve obtained by my system. If the resistance changes are small they may be ignored; if they are large it is desirable to compare my inductive-capacitive curve with a resistance curve of the same section of the well bore.

In actual practice it is contemplated that my system be used in conjunction with conventional resistance electrical logging systems. No single electrical log curve can be relied upon to identify formation; therefore, the conventional practice is to make simultaneously or consecutively several curves of the well bore and compare them. For example, a standard electrical log comprises:

1. A natural potential curve which indicates the free or natural voltage differentials between different formations.

2. A shallow resistivity curve in which the zone of measurement is within a few inches of the well bore.

3. A deep resistivity curve in which the zone of measurement is several feet from the well bore.

Each curve responds to certain conditions more readily than the others. By comparing the curves relable interpretations and deductions can be made that could not be made from any one of the curves independently.

Thus it is contemplated that the curve obtained by my system, which stresses the inductive-capacitive effects of the formation, will be compared with other electrical log curves. For example, if an apparently high capacitive "hump" is found on the inductive-capacitive curve, resort is had to the resistivity curves, usually the deep resistivity curve. If, for example, there is no corresponding "hump" in the deep resistivity curve, indicating a material resistance change, then, clearly, a capacitive change is indicated. On the other hand, if there is a corresponding resistance "hump" then the magnitude of the capacitive "hump" is discounted. It is possible, mathematically, to determine a correction factor so that a resistivity curve may be used to eliminate from the inductive-capacitive curve all or most of the spurious indication due to resistance change. Practically, however, this is not necessary.

In the above consideration of the practical application of my inductive-capacitive system I have considered only the "off balance" method of recording. If a "null balance" method is used, wherein the null condition is maintained within close tolerances, only slight spurious effects are introduced by resistivity changes for, obviously, as long as the signal received by the galvanometer 30 is maintained, as shown in Figure 3, resistance change, being 90 degrees out of phase, can not greatly affect the curve.

It also should be noted that while only a conventional two-electrode system is shown, it is obvious that a conventional three or four-electrode system may be used in which electrodes connected with conductors of a multiple-conductor cable may be substituted for the grounds 5 and 26.

Various changes and alternate arrangements may be made within the scope of the appended claims, in which it is my intention to claim all novelty inherent in the invention as broadly as the prior art permits.

I claim:

1. A method of electrically logging well bores, characterized by: establishing an alternating current field in the formation traversed by a well bore; establishing a probe circuit for electrically sampling said alternating current field; commutating the alternating current in said probe circuit in a manner to render the reversal of the probe current by commutation approximately 90 electrical degrees out of phase with respect to the alternating current potential as applied to the formation; moving the pickup portion of the probe circuit to a different location and measuring algebraically the resultant voltage, to detect shifting of the phase of the alternating current in the formation due to inductive or capacitive characteristics of the formation at said different location.

2. A method of detecting the inductive and capacitive characteristics of formation traversed by a well bore, characterized by: establishing an input circuit creating an alternating current field in the formation to be investigated; establishing a probe circuit for sampling the electrical field formed in said formation; adjusting the phase relationship of the reversal of the probe current in the probe circuit with respect to the applied potential of the input circuit until the phase relationship is approximately 90 electrical degrees; and then moving the pickup portion of the probe circuit to a different location and detecting the changes in such phase relationship due to the inductive and capacitive characteristics of the formation at said different location.

3. A method of detecting the inductive and capacitive characteristics of formation traversed by a well bore, characterized by: moving an input and probe electrode along a well bore; utilizing the input electrode to establish an alternating current field in the formation; utilizing the probe electrode to sample the lectrical field; establishing by commutation, while the current flowing between the input electrode and probe electrode is substantially free of phase shift, a phase relationship of approximately 90 degrees between the reversals of the alternating current potential as introduced and the reversals of the alternating current as sampled; and then detecting, as said electrodes are moved along the well bore, changes in such phase relation due to the inductive and capacitive characteristics of formation traversed.

MERLE C. BOWSKY.